(12) United States Patent
Brown et al.

(10) Patent No.: US 8,244,781 B2
(45) Date of Patent: Aug. 14, 2012

(54) NETWORK ACCESSED STORAGE FILES SYSTEM QUERY/SET PROXY SERVICE FOR A STORAGE VIRTUALIZATION SYSTEM

(75) Inventors: Ronald Brown, Dunfermline (GB); Philip Love, Alhambra, CA (US); Dylan Simon, New York, NY (US); John Bankier, Glasgow (GB)

(73) Assignee: EMC Corporation, Hopkinton, MA (US)

( * ) Notice: Subject to any disclaimer, the term of this patent is extended or adjusted under 35 U.S.C. 154(b) by 191 days.

(21) Appl. No.: 11/904,721

(22) Filed: Sep. 28, 2007

(65) Prior Publication Data

US 2009/0089344 A1    Apr. 2, 2009

(51) Int. Cl.
G06F 7/00 (2006.01)
(52) U.S. Cl. ........................................ 707/827
(58) Field of Classification Search .................. 707/205, 707/827, 609
See application file for complete search history.

(56) References Cited

U.S. PATENT DOCUMENTS

| | | | |
|---|---|---|---|
| 2002/0129216 A1* | 9/2002 | Collins | 711/170 |
| 2003/0110237 A1* | 6/2003 | Kitamura et al. | 709/219 |
| 2003/0182257 A1* | 9/2003 | O'Connell et al. | 707/1 |
| 2005/0125503 A1* | 6/2005 | Iyengar et al. | 709/213 |
| 2009/0077097 A1* | 3/2009 | Lacapra et al. | 707/10 |

* cited by examiner

Primary Examiner — Jensen Hu
(74) Attorney, Agent, or Firm — Dergosits & Noah LLP; Todd A. Noah

(57) ABSTRACT

A system and method provides for querying and setting file attributes between Network File System and Common Internet File System network attached storage systems. Aspects of the present invention may be performed by a storage virtualization system that acts as an intermediary between one or more network attached storage systems. By querying and setting file attributes, files may be migrated between network attached storage systems while keeping the file attributes and primary location of the file contents intact. In addition, the present invention provides an additional aspect of ensuring that file names of multi-protocol files are compatible across every protocol.

18 Claims, 2 Drawing Sheets

NETWORK ACCESSED STORAGE FILES SYSTEM QUERY/SET PROXY SERVICE FOR A STORAGE VIRTUALIZATION SYSTEM

TECHNICAL FIELD

The present invention relates generally to storage virtualization, and specifically, to a system and method for a enabling a storage virtualization system to migrate files associated with offline file attributes.

BACKGROUND OF THE INVENTION

Business organizations managing large amounts of data assets have turned to storage virtualization systems to provide a scaleable way to monitor, optimize and manage files on network attached storage ("NAS") systems. NAS separates data storage from the client computer, and enables the administrator to centrally manage data files without having to access individual client computers. Users may access their primary NAS system over a network using a file path or domain address for their respective account directories. Using this path address, the users may also save files to storage devices attached to the NAS system. Additionally, files may be archived from the NAS system, preventing complications from having more updated files reside on user client computers.

As an organization's NAS system grows and reaches capacity, an administrator may implement storage virtualization to manage the NAS system. A storage virtualization system complements and increases the efficiency of the NAS system without disrupting the users. For example, to prevent data overflow on the NAS system, or to optimize NAS resources, the storage virtualization system may migrate or copy files from the primary NAS system to a secondary NAS system. To ensure seamless and transparent compatibility, the secondary NAS system may be designed to be as similar to the primary NAS system as possible.

The storage virtualization system may act as an intermediary between the client computer and the primary NAS system, permitting synchronization, migration or re-direction of data files to the secondary NAS system without impacting or involving the user. The storage virtualization system may be transparent such that NAS system users are not even aware that their files are being synchronized, migrated or re-directed to a secondary NAS system. In some instances, users may even access files using the same path address to the primary NAS system, but this address may be a logical or symbolic address that leads the user to the actual location of the file on the secondary NAS system.

A storage virtualization system may monitor data usage and flow to the NAS system, and may assess where the most effective storage of data may be. It may institute automated data migration services or it may operate under criteria set by the administrator. In order to ensure consistent and efficient data optimization, the storage virtualization must have complete access to files on the primary NAS system. Without this access, the storage virtualization system will not be able to accomplish its designated tasks.

One skilled in the relevant art will recognize that different NAS systems may use different file system protocols. For example, a NAS system may use the the Network File System ("NFS") protocol and another NAS system might use the Common Internet File System protocol ("CIFS") (formerly Server Message Block ("SMB") protocol). Each protocol has its own conventions and syntax that may restrict the ability to transfer files from one file system to the other. In most instances, data files from NFS NAS systems can only be copied or moved to other NFS NAS systems, and data files from CIFS NAS systems can only be copied or moved to other CIFS-NAS systems. Similarly, a storage virtualization system will typically only perform NFS-compatible requests when working with NFS NAS systems, and CIFS-compatible requests when working with CIFS NAS systems. A storage virtualization system may possess the ability to work with both NFS and CIFS systems, but may be restricted to only use one protocol at a time.

One skilled in the art will recognized that even despite the NFS or CIFS protocol, a NAS system vendor may apply conventions unique to its products. For example, one known difference between NFS and CIFS file systems involves file attributes, or metadata, associated with individual files. NFS file systems cannot see, use or list some file attributes that are openly recognized by CIFS systems. Similarly, some CIFS systems cannot see, use or list some file attributes that are openly recognized by NFS system. Nevertheless, despite this difference, some client computers and even some NAS systems still associate these incompatible file attributes with all its stored files, regardless if the file is stored on a NFS or CIFS NAS system. This may be a practice of the NAS system vendor. While this may not present any issues when an organization uses NAS systems from only that vendor, it is more common that the organization will use NAS systems from multiple vendors. Further, the use of incompatible file attributes may make it difficult or impossible for a storage virtualization system to migrate files with these file attributes.

One instance where incompatible file attributes create problems for storage virtualization occurs when a file has been archived. For example, in one type of NAS system, the NAS system will periodically archive files from the primary NAS system to a separate archive server. This may be under the direction of a user, administrator, or part of an automated archive process. When a user tries to access an archived file, he will notice that the file content is no longer on the primary NAS system. Rather, what will be left is a "stub file" that soft links or provides the path address to the archived file content. In some instances, the stub file will appear to be accessible on the primary NAS system, but there may be an indicator, icon or other attribute that shows that the file content is no longer online with the primary NAS system. For example, the file icon may appear to have a clock next to it. In another example, checking the file's properties will reveal that the "offline" attribute check box is selected. In a further example, an offline attribute may be directly associated with the stub file. The offline attribute may be a single-bit indicator or other small sequence of data associated with the stub file, and may simply be a notation that indicates the content of the file has been archived to another location. Since the offline attribute may simply be an indicator, it will not contain information that points to the actual location of the file's content. Rather, this information may form part of the stub file.

A storage virtualization system tasked with migrating files from a primary NAS system to a secondary NAS system may not be compatible with the offline attribute convention present in some NAS systems. As such, the storage virtualization system may migrate the stub file, but will lose the offline attribute indicator. Alternatively, the storage virtualization system may ignore the stub file and not migrate the data at all. In some instances, the storage virtualization system may migrate the stub file, but lose or be unable to access the path address to the archived file content. The result is that the migrated stub file will no longer be linked to its content, resulting in data loss or a failed data migration. What is therefore needed is a way to access and preserve the associated metadata attributes for files common to certain NAS systems to ensure that if these files are migrated, the user will be able to access the migrated file and the content associated with that migrated file.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

An embodiment of the present invention provides a system and method for cross-protocol like capabilities to a storage virtualization system. The present invention allows a storage virtualization system to repackage requests from one NAS protocol and apply them to another NAS protocol. An embodiment of the present invention further ensures that inconsistencies caused by protocol differences are not perpetuated after file migration.

Figure 1:
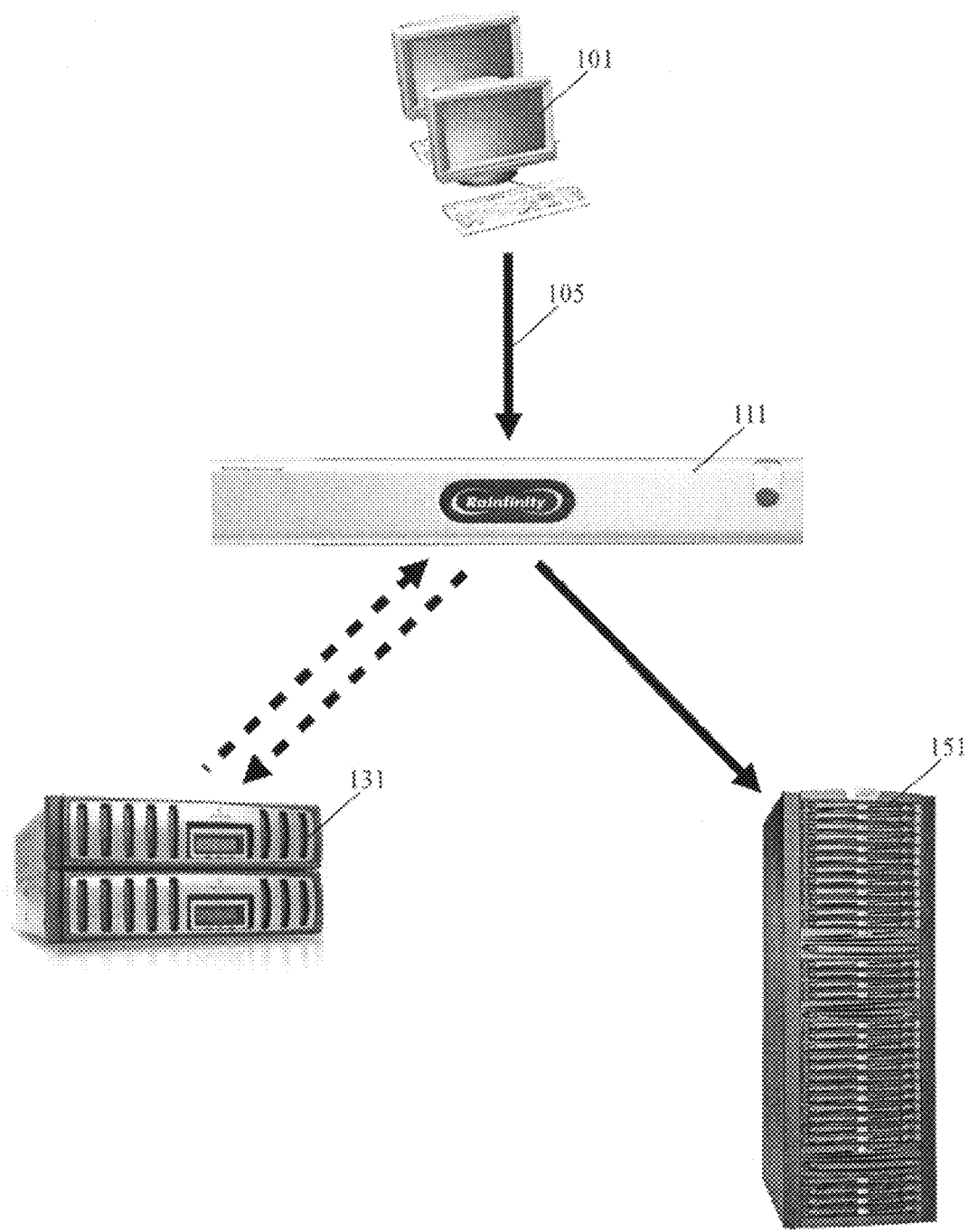
FIG. 1 is an exemplary block diagram depicting the elements of a storage virtualization system, according to one embodiment of the present invention.

FIG. 1 illustrates one exemplary setup for a storage virtualization system. The client 101 accesses a primary NAS system 131 connected to a network 105. The storage virtualization system 111 is an intermediary that may cause data from the NAS system 131 to be re-directed, migrated or copied to the secondary NAS system 151. One will appreciate that FIG. 1 is merely an example of how a storage virtualization system 111 might interact with a primary NAS system 131 and a secondary NAS system 151, and that other setups are possible without departing from the scope of the present disclosure.

As is known in the art, NFS and CIFS protocols have their own set of rules and conventions for dealing with data files stored in their respective NAS systems. One will appreciate that while certain embodiments of the present invention are presented with reference to NFS and CIFS systems, other protocols may utilize aspects of the present disclosure without departing from the scope of this disclosure. Within each NFS or CIFS NAS system, there may be additional features unique to the vendor's product. For example, if a NAS system has archived a file and stored the file content in another server, it may leave a stub file that soft links to the archived content. The stub file may be associated with an offline attribute denoting that the file content has been archived. In order to recover the file's content, the user will need to refer to the stub file, and will need to recall the file's content from the archive. A user will know that this recall may be required because the stub file will be associated with or will display the property of having an offline attribute. One will appreciate that offline attributes are common to CIFS NAS systems, but NFS NAS systems do not commonly use or recognize offline attributes. However, it is known that some NFS NAS system vendors store files using the stub file/offline attribute convention, even though this feature is not recognized by the NFS protocol. These particular NFS NAS systems are likely compatible with other NFS NAS systems from the same vendor, but if a NFS NAS system from another vendor is used, then these offline attributes will be invisible.

If an administrator wishes to migrate files from a NFS NAS system having stub files with offline attributes, the administrator will not be able to use current storage virtualization systems. The storage virtualization system will recognize that the NAS system is a NFS NAS system, so will issue requests using the NFS protocol. Since the NFS protocol does not recognize or even see offline attributes, these particular stub files may not be migrated properly. The stub file may be migrated without the offline attribute, or the stub file may not be migrated at all. As a result, a user trying to access the archived file content associated with the stub file will no longer be able to recall that file content. Additionally, because the storage virtualization system is transparent, the user may not know that the file has been migrated to a secondary NAS system, or that migration was attempted. All the user may realize is that he can no longer recall or access his file content.

In order to permit access and enable data migration of files with offline attributes, present storage virtualization systems must be modified with the present invention. One will appreciate that even though a storage virtualization system can interact with NFS NAS systems and CIFS NAS systems, the storage virtualization system will only invoke NFS compatible requests when interacting with a NFS NAS system, and will only invoke CIFS compatible requests when interacting with a CIFS NAS system. One will also appreciate that stub file offline attributes are invisible and not used by NFS NAS systems, but are common to and understood by CIFS NAS systems. As such, an embodiment of the present invention enables a storage virtualization system to apply a CIFS request during interaction with a NFS NAS system, thereby allowing the offline attributes to become visible and transferable to the data migration destination.

Figure 2:
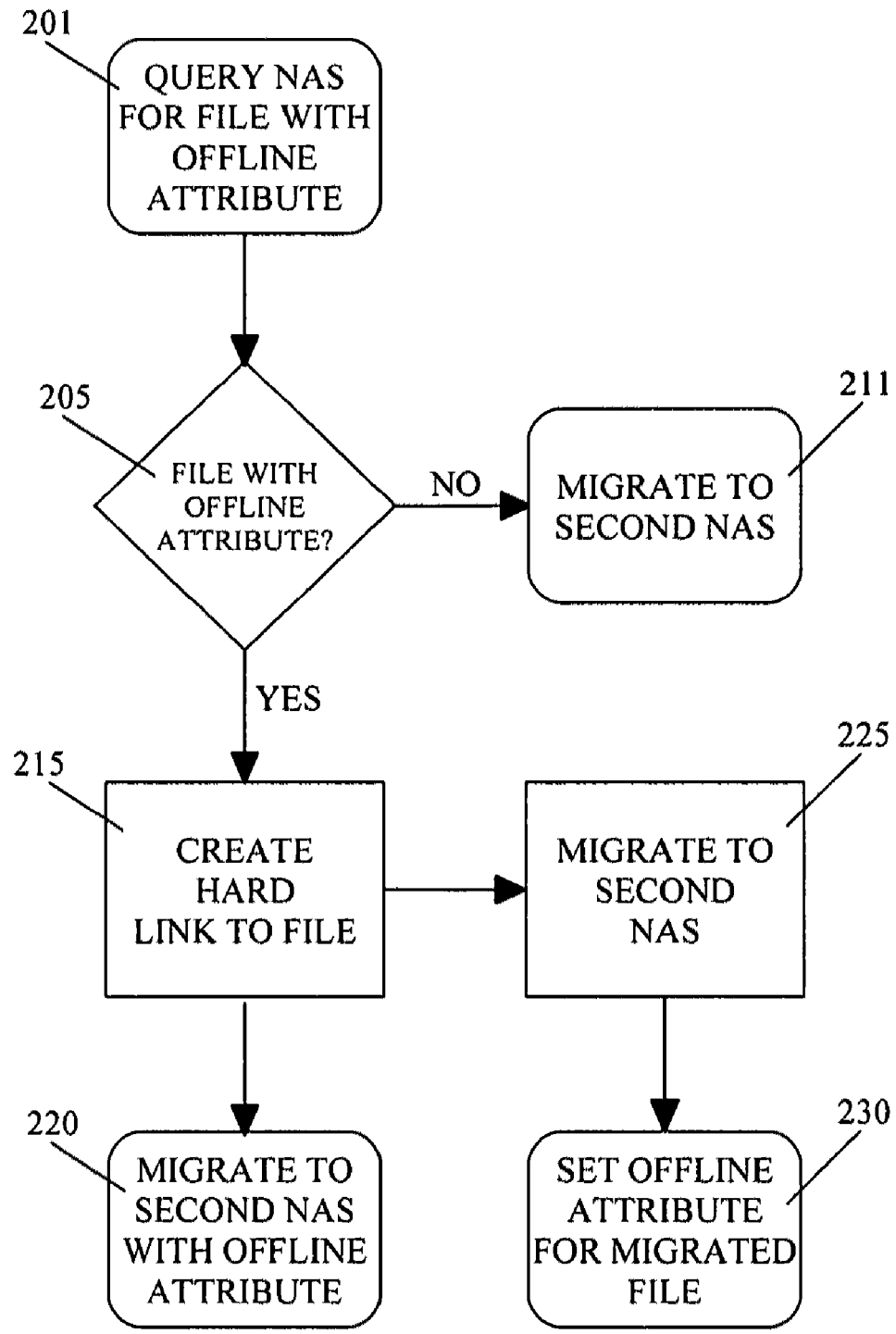
FIG. 2 is an exemplary flow diagram illustrating the steps of an embodiment of the present invention.

The present invention will enable a storage virtualization system 111 to perform certain method steps during a data migration or data synchronization process between a plurality of primary NFS NAS systems 131 and secondary NFS NAS systems 151. Referring now to FIG. 2, one skilled in the relevant art will appreciate that while the method steps illustrated in FIG. 2 and described herein are performed in a certain order, the order of the described steps is merely exemplary and may be varied without departing from the spirit of the present invention. In one example, when the storage virtualization system 111 is tasked with the management of a NFS NAS system 131 that stores files with offline attributes, the storage virtualization system will scan or query the NFS NAS system 131 to identify those files (step 201). One will appreciate that not all files on the NAS system 131 will have offline attributes, as such, the present invention will not affect those files, and those files may be migrated to the secondary NAS system 151 (step 211). One will also appreciate that the present invention may perform its functions on all files in the NAS system 131 without affecting those files that do not possess offline attributes. In any case, once the storage virtualization system 111 has identified which files have offline attributes (step 205), it may invoke a "CIFS protocol proxy service" designed to work with these NFS NAS system files. The CIFS protocol proxy service is an aspect of the present invention that enables an instruction or request from one protocol (CIFS) to be applied to a process executed in another protocol (NFS). In this embodiment, the CIFS protocol proxy service may query files in the NFS NAS system 131 (step 201), identify those files with offline attributes (step 205), and permit those files to be migrated with those offline attributes intact (step 220). Without the CIFS protocol proxy service, the storage virtualization system 111 would not see or recognize which files in the NFS NAS system 131 have offline attributes. With the CIFS protocol proxy service, the storage virtualization system 111 has the capability of identifying those files.

Once those files on the NFS NAS system have been identified, then the present invention will enable the storage virtualization system to migrate those files. The offline attributes for those files will accompany those files to the secondary NAS system (step 220). In another embodiment, the storage virtualization system may perform the file migration to the secondary NAS system (step 225), then set the offline attributes for the migrated file (step 230). In any case, the result is that the migrated file on the secondary NAS system has all of the necessary information to enable a user to recall the file content for the migrated file, just as the user could prior to file migration.

In some instances, the present invention may need to invoke an additional step in order to permit transfer of the file. It is well known that certain filename syntax is permitted in the NFS protocol, but not permitted in the CIFS protocol. For example, an NFS file name may contain the colon (:) character, but the colon (:) character is not permitted in CIFS. Therefore, when performing the steps of the present invention, the storage virtualization system may not be able to invoke the CIFS protocol proxy service, because the CIFS protocol proxy service, and therefore the storage virtualization system using the service, will not understand the file name for the file being queried.

To overcome this additional incompatibility, software instructions are added to the CIFS protocol proxy service to ensure file names are multi-protocol compatible. These instructions include creating a hard link to the transferred file (step 215). The hard link will be given a name that is compatible in both CIFS and NFS protocols. For example, the hard link will be free of characters such as the colon (:). One will appreciate that a hard link is a direct pointer to the file content, and differs from a soft link, which is a path that identifies the target of the soft link. In the present invention, the hard link may be created prior to invocation of the CIFS protocol proxy service using a link system call command or similar. By adding the hard link functionality to the CIFS protocol proxy service aspect of the present invention, the present invention overcomes any potential file name incompatibilities between the CIFS protocol proxy service and the NFS NAS system.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, the present invention has been described as imparting partial CIFS compatibility to an NFS file transfer process by a storage virtualization system. One will appreciate that an embodiment of the present invention may permit partial NFS compatibility to a CIFS file transfer process without departing from the spirit of the present invention or the scope of the disclosure herein. There may be file attributes used in certain vendor's CIFS NAS systems that are invisible to CIFS, but recognizable by NFS. As such, the present invention may be modified to provide a NFS protocol proxy service to preserve those CIFS-incompatible file attributes. Indeed, the present invention may enable any protocol proxy service to provide cross-protocol functionality to a storage virtualization system. The present invention may easily be modified to consider these situations without departing from the present disclosure.

What is claimed is:

1. A method comprising:
   providing a network having a storage virtualization system, a first NAS system and a second NAS system, wherein the storage virtualization system, the first NAS system, and the second NAS system use a first file system protocol, and wherein the first NAS system stores at least one data file and an associated file attribute not recognized by the first file system protocol;
   executing, by the storage virtualization system, a query using a second file system protocol that recognizes the file attribute of the at least one data file; and
   if the at least one data file has a the name permitted by the first system protocol and not permitted by the second file system protocol, then creating a hard link to the at least one data file, wherein a the hard link is given a name that is permitted by the first and second file system protocols, and migrating, by the storage virtualization system using the first file system protocol, the at least one data file and the associated file attribute from the first NAS system to the second NAS system;
   if the at least one data file has a name permitted by the second file system protocol, then migrating, by the storage virtualization system using the first file system protocol, the at least one data file and the associated file attribute from the first NAS system to the second NAS system.

2. The method of claim 1, wherein the hard link name is created by a user.

3. The method of claim 1, wherein the hard link name is permitted by a NFS protocol.

4. The method of claim 1, wherein the hard link name is permitted by a CIFS protocol.

5. The method of claim 1, wherein the storage virtualization system, first NAS system and second NAS system use a NFS protocol, and the file attribute and the query are recognized by a CIFS protocol.

6. The method of claim 1, wherein the storage virtualization system, first NAS system and second NAS system use a CIFS protocol, and the file attribute and the query are recognized by a NFS protocol.

7. A method comprising:
   providing a network having a storage virtualization system, a first NAS system and a second NAS system, wherein the storage virtualization system, the first NAS system, and the second NAS system use a first file system protocol, and wherein the first NAS system stores at least one data file and an associated file attribute not recognized by the first file system protocol, wherein the data file has a file name permitted by the first system protocol and not by the second system protocol;
   executing, by the storage virtualization system, a query using a second file system protocol that recognizes the file attribute of the at least one data file;
   creating a hard link to the at least one data file, wherein a the hard link is given a name that is permitted by the first and second file system protocols; and
   migrating, by the storage virtualization system using the first file system protocol, the at least one data file and the associated file attribute from the first NAS system to the second NAS system.

8. The method of claim 7, wherein the hard link name is created by a user.

9. The method of claim 7, wherein the hard link name is permitted by a NFS protocol.

10. The method of claim 7, wherein the hard link name is permitted by a CIFS protocol.

11. The method of claim 7, wherein the storage virtualization system, first NAS system and second NAS system use a NFS protocol, and the file attribute and the query are recognized by a CIFS protocol.

12. The method of claim 7, wherein the storage virtualization system, first NAS system and second NAS system use a CIFS protocol, and the file attribute and the query are recognized by a NFS protocol.

13. A system comprising:
   a first NAS system and a second NAS system connected to a network, the first NAS system, and the second NAS system use a first file system protocol;
   a storage virtualization system connected to the network, wherein the storage virtualization system includes computer code that detects on the first NAS system a file attribute associated with a data file recognized by a second file system protocol but not recognized by the first file system protocol, creates a hard link to the data file recognized by the first and second file system protocols, and migrates the data file and file attribute to the second NAS system.

14. The system of claim 13, wherein the storage virtualization system, first NAS system and second NAS system use a NFS protocol, and the file attribute and the query are recognized by a CIFS protocol.

15. The system of claim 13, wherein the storage virtualization system, first NAS system and second NAS system use a CIFS protocol, and the file attribute and the query are recognized by a NFS protocol.

16. The system of claim 13, wherein a hard link name is created by a user.

17. The system of claim 13, wherein a hard link name is permitted by a NFS protocol.

18. The method of claim 13, wherein a hard link name is permitted by a CIFS protocol.

* * * * *